US011662793B2

(12) United States Patent
Wang et al.

(10) Patent No.: US 11,662,793 B2
(45) Date of Patent: May 30, 2023

(54) SELECTIVELY DISABLING POWER DELIVERY TO A GROUPING OF MEMORY DEVICES OF AN INFORMATION HANDLING SYSTEM

(71) Applicant: Dell Products L.P., Round Rock, TX (US)

(72) Inventors: Isaac Q. Wang, Austin, TX (US); Lee Zaretsky, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/446,212

(22) Filed: Aug. 27, 2021

(65) Prior Publication Data

US 2023/0065935 A1 Mar. 2, 2023

(51) Int. Cl.
*G06F 1/30* (2006.01)
*G06F 11/07* (2006.01)
*G06F 11/14* (2006.01)
*G06F 1/3234* (2019.01)

(52) U.S. Cl.
CPC .............. *G06F 1/30* (2013.01); *G06F 1/3275* (2013.01); *G06F 11/0772* (2013.01); *G06F 11/1417* (2013.01)

(58) Field of Classification Search
CPC ........ G06F 1/30; G06F 1/3225; G06F 1/3275; G06F 11/07; G06F 11/0772
See application file for complete search history.

(56) References Cited

U.S. PATENT DOCUMENTS

| 11,335,416 B1* | 5/2022 | Sforzin ............... G11C 16/0483 |
| 2020/0226045 A1* | 7/2020 | Le ............................ G06F 1/30 |
| 2021/0255966 A1* | 8/2021 | Chen ................... G06F 13/1689 |

* cited by examiner

*Primary Examiner* — Mark A Connolly
(74) *Attorney, Agent, or Firm* — McDermott Will & Emery LLP (57) ABSTRACT

A method of selectively disabling power delivery to a group of memory devices of an information handling system, the method including performing an initialization of a first memory device and a second memory device of the memory devices; after performing the initialization of the memory devices, performing boot procedures at the first memory device and the second memory device; while performing the boot procedures at the first memory device and the second memory device, detecting a memory failure of the first memory device; in response to detecting the memory failure of the first memory device, providing a signal to a power management integrate circuit (PMIC) of the first memory device to disable power at the first memory device; and continuing the boot procedures at the second memory device.

12 Claims, 5 Drawing Sheets

SELECTIVELY DISABLING POWER DELIVERY TO A GROUPING OF MEMORY DEVICES OF AN INFORMATION HANDLING SYSTEM

BACKGROUND

Field of the Disclosure

The disclosure relates generally to an information handling system, and in particular selectively disabling power delivery to a grouping of memory devices of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of selectively disabling power delivery to a group of memory devices of an information handling system, the method including performing an initialization of a first memory device and a second memory device of the memory devices; after performing the initialization of the memory devices, performing boot procedures at the first memory device and the second memory device; while performing the boot procedures at the first memory device and the second memory device, detecting a memory failure of the first memory device; in response to detecting the memory failure of the first memory device, providing a signal to a power management integrate circuit (PMIC) of the first memory device to disable power at the first memory device; and continuing the boot procedures at the second memory device.

Other embodiments of these aspects include corresponding systems, apparatus, and computer programs, configured to perform the actions of the methods, encoded on computer storage devices.

These and other embodiments may each optionally include one or more of the following features. For instance, providing the signal to the PMIC of the first memory device further comprises providing the signal to the PMIC of the first memory device by a service controller. Providing the signal to the PMIC of the first memory device further comprises providing the signal to the PMIC of the first memory device by an external overriding circuit. Providing the signal to the PMIC of the first memory device further comprises providing the signal to the PMIC of the first memory device by a processor in communication with the memory device. Providing the signal to the PMIC of the first memory device further comprises providing the signal to the PMIC of the first memory device to override a power enable signal at the first memory device. Providing the signal to the PMIC of the first memory device further comprises providing the signal to the PMIC of the first memory device to place the first memory device in a low power mode. Providing the signal to the PMIC of the first memory device to place the first memory device in the low power mode further includes maintaining power at the PMIC. Performing the boot procedures further comprises performing memory training at the first and the second memory devices. Performing the boot procedures further comprises performing memory testing at the first and the second memory devices. Performing the boot procedures further comprises performing a population rule check at the first and the second memory devices.

Particular implementations of the subject matter described in this specification can be implemented so as to realize one or more of the following advantages. For example, battery runtime of a portable information handling system can be improved, a thermal envelop of the portable information handling system can be reduced, and acoustic performance can be improved.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for selectively disabling power delivery to a grouping of memory devices of an information handling system. In short, when a failure of one or more memory devices is detected, the failed memory device can be mapped out and power delivery to the failed memory device can be selectively disabled to conserve energy.

Specifically, this disclosure discusses a system and a method for selectively disabling power delivery to a grouping of memory devices (e.g., two or more memory devices) of an information handling system, the method including performing an initialization of a first memory device and a second memory device of the memory devices; after performing the initialization of the memory devices, performing boot procedures at the first memory device and the second memory device; while performing the boot procedures at the first memory device and the second memory device, detecting a memory failure of the first memory device; in response to detecting the memory failure of the first memory device, providing a signal to a power management integrate circuit (PMIC) of the first memory device to disable power at the first memory device; and continuing the boot procedures at the second memory device. In some examples, the memory devices can include on-board memory devices. In some examples, the memory devices can be memory Dual In-line memory module (DIMM) modules.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
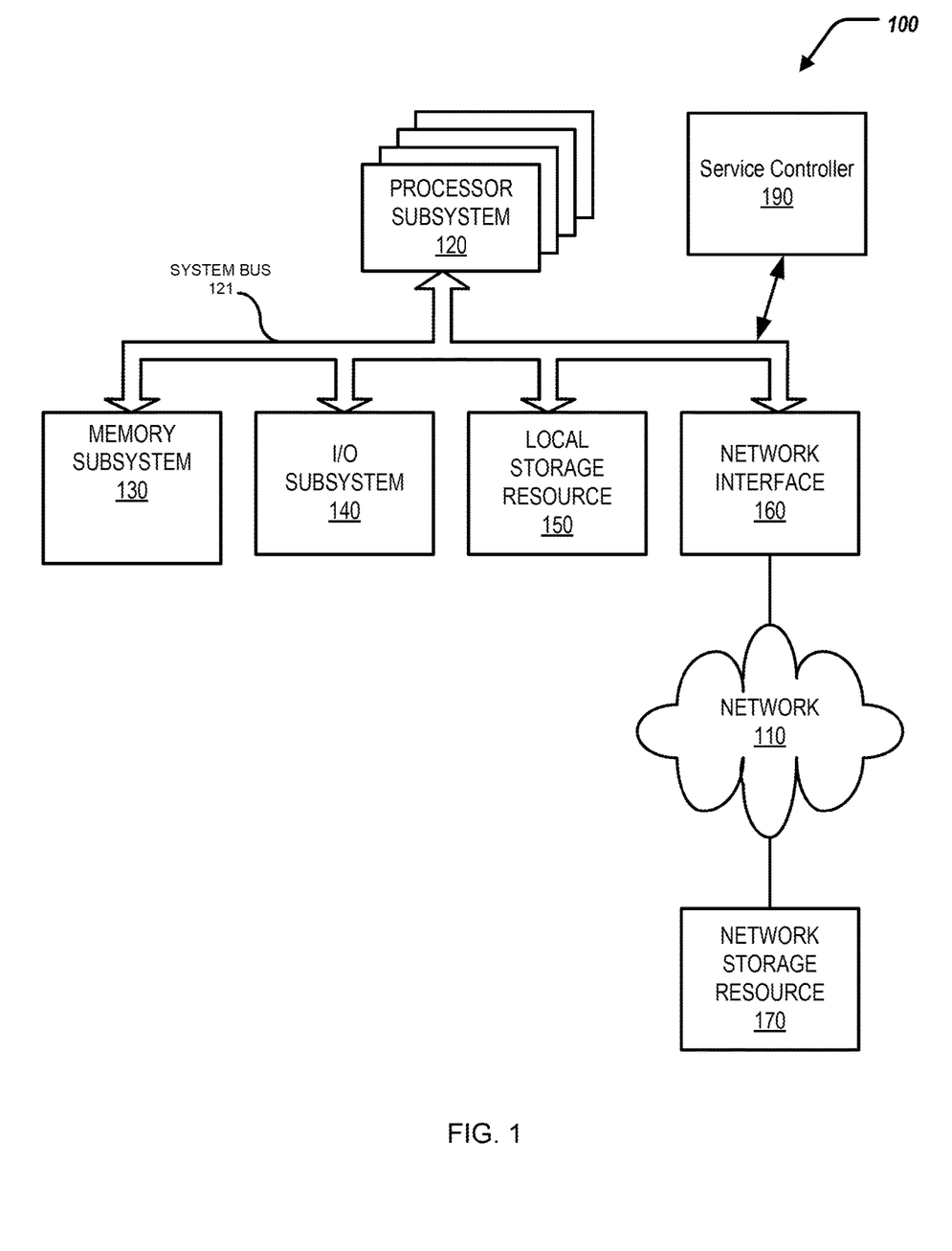
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Double data rate (DDR) memory bus, Peripheral Component Interconnect (PCI) bus, PCI-Express bus, HyperTransport (HT) bus, High Definition Multimedia Interface (HDMI) bus, Universal Serial Bus (USB) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a service controller 190. In some examples, the service controller 190 is an embedded controller.

In short, when a failure of one or more memory devices of the memory subsystem 130 is detected, the processor subsystem 120 can map out the bad memory device, and selectively disable power delivery to the failed memory device to conserve energy.

Figure 2:
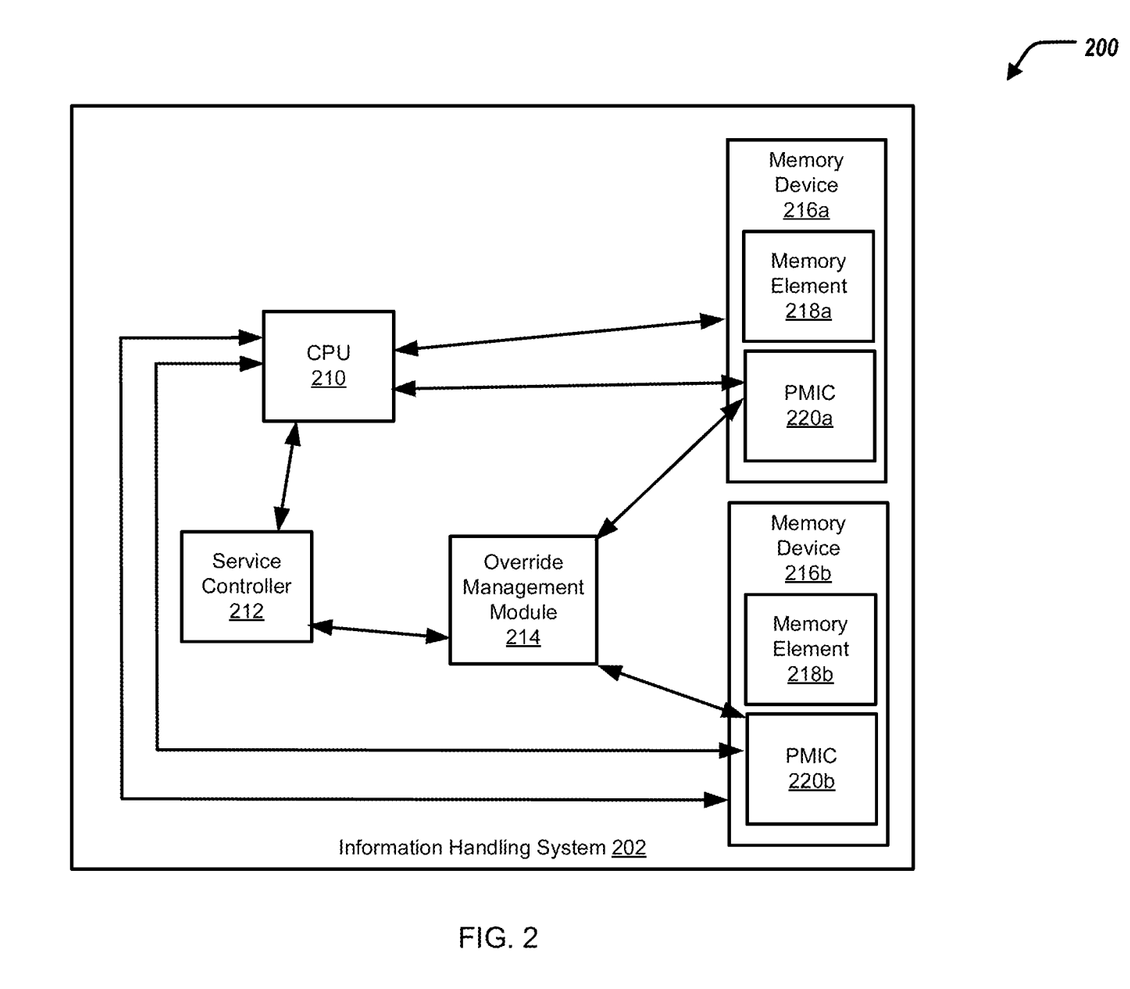
FIG. 2 illustrates a block diagram of an information handling system for selectively disabling power delivery to a grouping of memory devices, in a first implementation.

Turning to FIG. 2, FIG. 2 illustrates an environment 200 including an information handling system 202. The information handling system 202 can include a central processing unit (CPU) 210, a service controller 212, an override management module 214, a first memory device 216a, and a second memory device 216b (collectively referred to as memory devices 216). The information handling system 202 can include any number of memory devices 216.

In some examples, the information handling system 202 is similar to, or includes, the information handling system 100 of FIG. 1. In some examples, the information handling system 100 is a client information handling device. In some examples, the information handling system 100 is a server information handling system.

In some examples, the CPU 210 is the same, or substantially the same, as the processor subsystem 120 of FIG. 1. In some examples, the service controller 212 is the same, or substantially the same, as the service controller 190 of FIG. 1. In some examples, the memory devices 216 are the same, or substantially the same, as the memory subsystem 130 of FIG. 1. The information handling system 202 can include any number of memory devices 216, depending on the application desired.

The first memory device 216a can include a memory element 218a and a power management integrated circuit (PMIC) 220a. The second memory device 216b can include a memory element 218b and a power management integrated circuit (PMIC) 220b. In some examples, the memory device 216 is a double data rate 4 (DDR4) dual in-line memory module (DIMM). In some examples, the memory device 216 is a double data rate 5 (DDR5) dual in-line memory module (DIMM). In some examples, the memory device 216 is any DDR technology. In some examples, the memory element 218 is a group of one or more dynamic random-access memory (DRAM) devices. In some examples, the memory elements 218 and the PMICs 220 can be on separate DIMMs, or soldered down on a main motherboard (on-board memory). In some examples, the memory devices 216 are physical separate differing memory structures that may reside on the main motherboard.

In some examples, the service controller 212 is an embedded controller (EC). In some examples, the service controller 212 is a Baseboard Management controller (BMC). In some examples, the override management module 214 is a transistor switch (MOSFET switch) circuitry or any logic that realizes the power control override function.

The CPU 210 can be in communication with the memory devices 216 (memory channels). The CPU 210 can further be in communication with the PMICs 220. The CPU 210 can further be in communication with the service controller 212. The service controller 212 can be in communication with the CPU 210 and the override management module 214. The override management module 214 can be in communication with the PMICs 220.

To that end, power delivery to the memory devices 216 can be selectively disabled. Specifically, the CPU 210 can perform an initialization of the memory devices 216. Specifically, the CPU 210 can perform such initialization procedures as a serial presence detect (SPD), POR support comparison, and configuration check. After the initialization of the memory devices 216 is performed, the CPU 210 can attempt to perform boot procedures at the memory devices 216. The boot procedures can include memory training of the memory devices 216, memory testing of the memory devices 216, and/or population rule check of the memory devices 216. In some examples, after initialization of the memory devices 216 is performed, the CPU 210 can initiate (or attempt) boot procedures at the memory devices 216.

The CPU 210 can, while performing the boot procedures at the memory devices 216 (or attempt to perform), detect a memory failure at the first memory device 216a. Specifically, during a power-on self-test (POST) boot procedure, the CPU 210 can detect failures at the first memory device 216a. In some examples, the CPU 210 can detect failures at the first memory device 216a and map out such failures ("bad memory") at (or to) the first memory device 216a.

The CPU 210 can, in response to detecting the memory failure at the first memory device 216a, provide a signal to the PMIC 220a of the first memory device 216a directly or indirectly (via the service controller 212 and override management module 214) to disable power at the first memory device 216a. Specifically, the service controller 212 or the CPU 210 can, in response to detecting the memory failure at the first memory device 216a, provide a signal to the PMIC 220a to disable power at (or provided to) the memory element 218a. In some examples, the service controller 212 or the CPU 210 can, in response to detecting the memory failure at the first memory device 216a, provide a signal to the override management module 214. The override management module 214 can then provide the signal to the PMIC 220a to disable power at the first memory device 216a. In some examples, the override management module 214 is a MOSFET switch. For example, the CPU 210 or the service controller 212 de-asserts a "PWR_EN" signal to disable power at the first memory device 216a. In some examples, the CPU 210, in response to the detection of the memory failure at the first memory device 216a, can provide a signal to the PMIC 220a of the first memory device 216a to disable power at the first memory device 216a. Specifically, the CPU 210 can, in response to detection of the memory failure at the first memory device 216a, can provide a signal to the PMIC 220a to disable power at (or provided to) the memory element 218a. For example, the CPU 210 provides a "VR DISABLE" command to the first memory device 216a.

In some examples, providing the signal to the PMIC 220a to disable power at the first memory device 216a (by the CPU 210 or the service controller 212 thru the override management module 214) can include providing a signal to override a power enable signal at the first memory device 216a.

In some examples, providing the signal to the PMIC 220a to disable power at the first memory device 216a (by the CPU 210 or the service controller 212 thru the override management module 214) can include providing a signal to place the first memory device 216a in a low power mode. Specifically, providing a signal to the PMIC 220a to place the first memory device 216a in a low power mode can include maintaining power at the PMIC 220a. For example, the CPU 210 or the service controller 212 thru the override management module 214 can provide a signal to the first memory device 216a to disable power at the memory element 218a while maintaining power at the PMIC 220a—a "power down mode" such that power consumption at the memory device 216a is reduced and/or minimized.

The CPU 210 can then proceed with the remaining boot procedures at the second memory device 216b. That is, the boot procedures that have not been completed can be performed at the second memory device 216b. In some examples, the remaining boot procedures performed by the memory device 216b (or at the memory device 216b) can include memory training—e.g., voltages are trained/programmed, timing, and voltage parameter check. In some examples, the remaining boot procedures performed by the memory device 216b (or at the memory device 216b) can include memory testing—e.g., performing read/write operations. In some examples, the remaining boot procedures performed by the memory device 216b (or at the memory device 216b) can include a population rule check.

Figure 3:
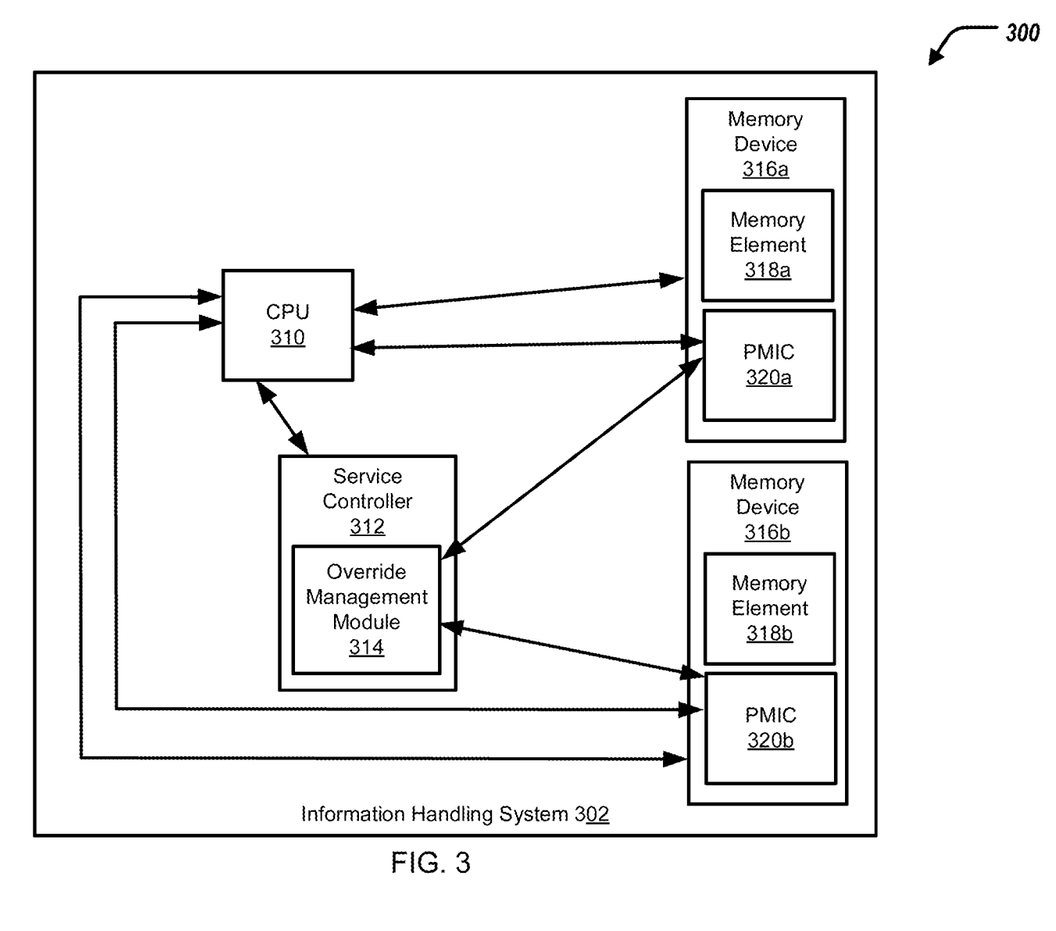
FIG. 3 illustrates a block diagram of an information handling system for selectively disabling power delivery to a grouping of memory devices, in a second implementation.

Turning to FIG. 3, FIG. 3 illustrates an environment 300 including an information handling system 302. The information handling system 302 can include a central processing unit (CPU) 310, a service controller 312, a first memory device 316a, and a second memory device 316b (collectively referred to as memory devices 316). The service controller 312 can include an override management module 314. That is, the override management module 314 is an integrated function of the service controller 312. The information handling system 302 can include any number of memory devices 316.

In some examples, the information handling system 302 is similar to, or includes, the information handling system 100 of FIG. 1. In some examples, the information handling system 302 is a client information handling device. In some examples, the information handling system 302 is a server information handling system.

In some examples, the CPU 310 is the same, or substantially the same, as the processor subsystem 120 of FIG. 1. In some examples, the service controller 312 is the same, or substantially the same, as the service controller 190 of FIG. 1. In some examples, the memory devices 316 are the same, or substantially the same, as the memory subsystem 130 of FIG. 1. The information handling system 302 can include any number of memory devices 316 depending on the application desired.

The first memory device 316a can include a memory element 318a and a power management integrated circuit (PMIC) 320a. The second memory device 316b can include a memory element 318b and a power management integrated circuit (PMIC) 320b. In some examples, the memory device 316 is a double data rate 4 (DDR4) dual in-line memory module (DIMM). In some examples, the memory device 316 is a double data rate 5 (DDR5) dual in-line memory module (DIMM). In some examples, the memory device 316 is any DDR technology. In some examples, the memory element 318 is a group of one or more dynamic random-access memory (DRAM) devices. In some examples, the memory elements 318 and the PMICs 320 can be on separate DIMMs, or soldered down on a main motherboard (on-board memory). In some examples, the memory devices 316 are physical separate differing memory structures that reside on the main motherboard.

In some examples, the service controller 312 is an embedded controller (EC). In some examples, the service controller 312 is a Baseboard management controller (BMC).

The CPU 310 can be in communication with the memory devices 316 (memory channels). The CPU 310 can further be in communication with the PMICs 320. The CPU 310 can further be in communication with the service controller 312. The service controller 312 can be in communication with the CPU 310. The override management module 314 (included by the service controller 312) can be in communication with the PMICs 320.

To that end, power delivery to the memory devices 316 can be selectively disabled. Specifically, the CPU 310 can perform an initialization of the memory devices 316. Specifically, the CPU 310 can perform such initialization procedures as a serial presence detect (SPD), POR support comparison, and configuration check. After the initialization of the memory devices 316 is performed by the CPU 310, the CPU 310 can perform (or attempt to perform) boot procedures at the memory devices 316. The boot procedures can include memory training of the memory devices 316, memory testing of the memory devices 316, and/or population rule check of the memory devices 316. In some examples, after initialization of the memory devices 316 is performed, the CPU 310 can initiate (or attempt) boot procedures at the memory devices 316.

The CPU 310 can, while performing the boot procedures at the memory devices 316 (or attempting to perform), detect a memory failure at the first memory device 316a. Specifically, during a power-on self-test (POST) boot procedure, the CPU 310 can detect failures at the first memory device 316a. In some examples, the CPU 310 can detect failures at the first memory device 316a and map out such failures ("bad memory") at (or to) the first memory device 316a.

In some examples, the CPU 310 can, in response to detection of the memory failure at the first memory device 316a, can provide a signal to the PMIC 320a of the first memory device 316a to disable power at the first memory device 316a directly or indirectly (via the service controller 312 and override management module 314). Specifically, the override management module 314 of the service controller 312 or the CPU 310 can, in response to detection of the memory failure at the first memory device 316a, provide a signal to the PMIC 320a to disable power at (or provided to) to the memory element 318a. For example, the CPU 310 or the service controller 312 de-asserts a "PWR_EN" signal to disable power at the first memory device 316a. In some examples, the CPU 310, in response to the detection of the memory failure at the first memory device 316a, can provide a signal to the PMIC 320a of the first memory device 316a to disable power at the first memory device 316a. Specifically, the CPU 310, in response to detection of the memory failure at the first memory device 316a, can provide a signal to the PMIC 320a to disable power at (or provided to) the memory element 318a. For example, the CPU 310 provides a "VR DISABLE" command to the first memory device 316a.

In some examples, providing the signal to the PMIC 320a to disable power at the first memory device 316a (by the CPU 310 or the override management module 314) can include providing a signal to override a power enable signal at the first memory device 316a.

In some examples, providing the signal to the PMIC 320a to disable power at the first memory device 316a (by the CPU 310 or the override management module 314) can include providing a signal to place the first memory device 316a in a low power mode. Specifically, providing a signal to the PMIC 320a to place the first memory device 316a in a low power mode can include maintaining power at the PMIC 320a. For example, the CPU 310 or the override management module 314 can provide a signal to the first memory device 316a to disable power at the memory element 318a while maintaining power at the PMIC 320a— a "power down mode" such that power consumption at the memory device 316a is reduced and/or minimized.

The CPU 310 can then proceed with the remaining boot procedures at the second memory device 316b. That is, the boot procedures that have not been completed can be performed at the second memory device 316b. In some examples, the remaining boot procedures performed by the memory device 316b (or at the memory device 316b) can include memory training—e.g., voltages are trained/programmed, timing, and voltage parameter check. In some examples, the remaining boot procedures performed by the memory device 316b (or at the memory device 316b) can include memory testing—e.g., performing read/write operations. In some examples, the remaining boot procedures performed by the memory device 316b (or at the memory device 316b) can include a population rule check.

Figure 4:
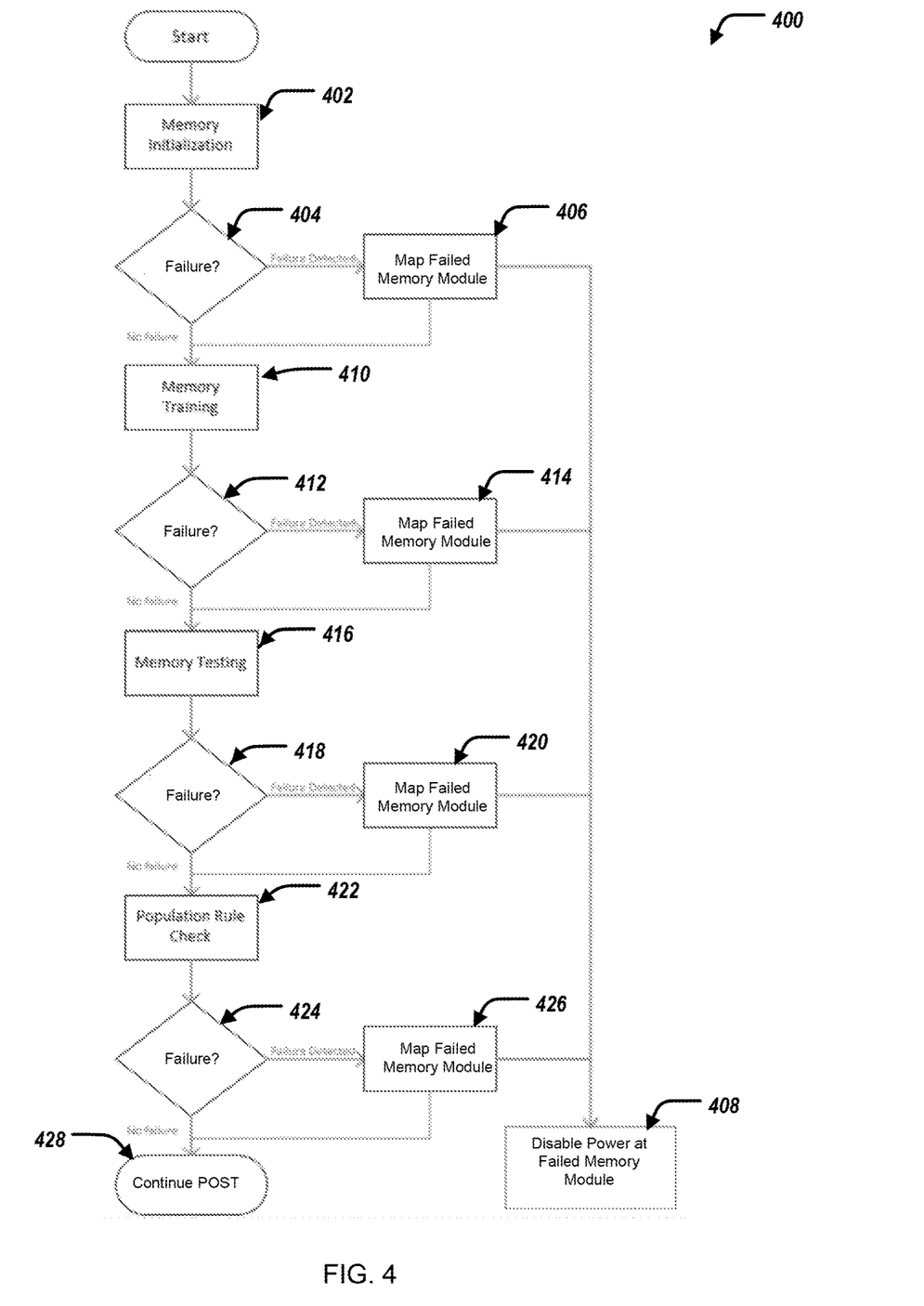
FIGS. 4, 5 illustrates respective methods for selectively disabling power delivery to a grouping of memory devices.

FIG. 4 illustrates a flowchart depicting selected elements of an embodiment of a method 400 for selectively disabling power delivery to memory devices. The method 400 may be performed by the information handling system 100, the information handling system 202, the CPU 210, the service controller 212, the override management module 214, and/or the memory devices 216 and with reference to FIGS. 1-2. It is noted that certain operations described in method 400 may be optional or may be rearranged in different embodiments.

The CPU 210 performs an initialization of the memory devices 216, at 402. The CPU 210 determines whether there is a memory failure at the memory devices 216 during initialization, at 404. When the CPU 210 determines that there is a failure at the memory devices 216 during initialization, the CPU 210 maps out the failed memory (e.g., the first memory device 216a), at 406. The service controller 212 (through the override management module 214) or the CPU 210 then disables powers at the failed memory device (e.g., the first memory device 216a), at 408. Furthermore, the process proceeds to 410 for the remaining non-failed memory device (e.g., the second memory device 216b).

When the CPU 210 determines that there is not a failure at the memory devices 216 during initialization, the CPU 210 performs memory training at the memory devices 216, at 410. The CPU 210 determines whether there is a memory failure at the memory devices 216 during memory training, at 412. When the CPU 210 determines that there is a failure at the memory device 216 during memory training, the CPU 210 maps out the failed memory (e.g., the first memory device 216a), at 414. The service controller 212 (through the override management module 214) or the CPU 210 then disables power at the failed memory device (e.g., the first memory devices 216a), at 408. Furthermore, the process proceeds to 416 for the remaining non-failed memory device (e.g., the second memory device 216b).

When the CPU 210 determines that there is not a failure at the memory devices 216 during memory training, the CPU 210 performs memory testing at the memory devices 216, at 416. The CPU 210 determines whether there is a memory failure at the memory devices 216 during memory training, at 418. When the CPU 210 determines that there is a failure at the memory devices 216 during memory testing, the CPU 210 maps out the failed memory (e.g., the first memory device 216a), at 420. The service controller 212 (through the override management module 214) or the CPU 210 then disables power at the failed memory device (e.g., the first memory device 216a), at 408. Furthermore, the process proceeds to 422 for the remaining non-failed memory device (e.g., the second memory device 216b).

When the CPU 210 determines that there is not a failure at the memory devices 216 during memory testing, the CPU 210 performs a population rule check at the memory devices 216, at 422. The CPU 210 determines whether there is a population rule failure at the memory devices 216 during memory training, at 424. When the CPU 210 determines that there is a failure at the memory devices 216 during population rule check, the CPU 210 maps out the failed memory (e.g., the first memory device 216a), at 426. The service controller 212 (through the override management module 214) or the CPU 210 then disables powers at the failed memory device (e.g., the first memory device 216a), at 408. Furthermore, the process proceeds to 428 for the remaining non-failed memory device (e.g., the second memory device 216b).

When the CPU 210 determines that there is not a failure at the memory devices 216 during population rule check, the CPU 210 can continue the POST boot procedure, at 428.

Similarly, the method 400 may be performed by the information handling system 100, the information handling system 302, the CPU 310, the service controller 312, the override management module 314, and/or the memory devices 316 and with reference to FIGS. 1 and 3. It is noted that certain operations described in method 400 may be optional or may be rearranged in different embodiments.

The CPU 310 performs an initialization of the memory devices 316, at 404. The CPU 310 determines whether there is a memory failure at the memory devices 316 during initialization, at 404. When the CPU 310 determines that there is a failure at the memory devices 316 during initialization, the CPU 310 maps out the failed memory (e.g., the first memory device 316a), at 406. The service controller 312 or CPU 310 then disables power at the failed memory device (e.g., the first memory device 316a), at 408. Furthermore, the process proceeds to 410 for the remaining non-failed memory device (e.g., the second memory device 316b).

When the CPU 310 determines that there is not a failure at the memory devices 316 during initialization, the CPU 310 performs memory training at the memory devices 316, at 410. The CPU 310 determines whether there is a memory failure at the memory devices 316 during memory training, at 412. When the CPU 310 determines that there is a failure at the memory devices 316 during memory training, the CPU 310 maps out the failed memory (e.g., the first memory device 316a), at 414. The service controller 312 or CPU 310 then disables power at the failed memory device (e.g., the first memory device 316a), at 408. Furthermore, the process proceeds to 416 for the remaining non-failed memory device (e.g., the second memory device 316b).

When the CPU 310 determines that there is not a failure at the memory devices 316 during memory training, the CPU 310 performs memory testing at the memory devices 316, at 416. The CPU 310 determines whether there is a memory failure at the memory devices 316 during memory training, at 418. When the CPU 310 determines that there is a failure at the memory devices 316 during memory testing, the CPU 310 maps out the failed memory (e.g., the first memory device 316a), at 420. The service controller 312 or CPU 310 then disables power at the failed memory device (e.g., the first memory device 316a), at 408. Furthermore, the process proceeds to 422 for the remaining non-failed memory device (e.g., the second memory device 316b).

When the CPU 310 determines that there is not a failure at the memory devices 316 during memory testing, the CPU 310 performs a population rule check at the memory devices 316, at 422. The CPU 310 determines whether there is a population rule failure at the memory devices 316 during memory training, at 424. When the CPU 310 determines that there is a failure at the memory devices 316 during population rule check, the CPU 310 maps out the failed memory (e.g., the first memory device 316a), at 426. The service controller 312 or the CPU 310 then disables power at the failed memory device (e.g., the first memory device 316a), at 408. Furthermore, the process proceeds to 428 for the remaining non-failed memory device (e.g., the second memory device 316b).

When the CPU 310 determines that there is not a failure at the memory devices 316 during population rule check, the CPU 310 can continue the POST boot procedure, at 428.

Figure 5:
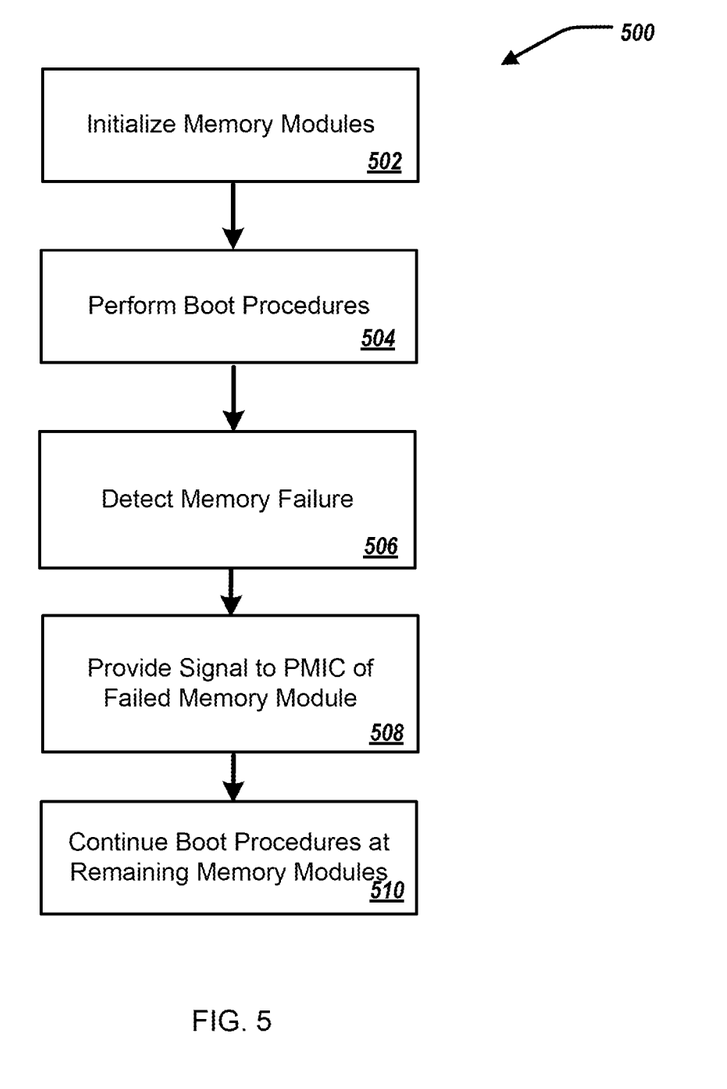

FIG. 5 illustrates a flowchart depicting selected elements of an embodiment of a method 500 for selectively disabling power delivery to memory devices. The method 500 may be performed by the information handling system 100, the information handling system 202, and/or the information handling system 302, and with reference to FIGS. 1-3. It is noted that certain operations described in method 500 may be optional or may be rearranged in different embodiments.

An initialization of a first memory device and a second memory device is performed (502). For example, the CPU 210 can perform the initialization of the memory devices 216. For example, the CPU 310 can perform the initialization of the memory devices 316.

After performing the initialization of the memory devices, boot procedures are performed at the first memory device and the second memory device (504). For example, the CPU 210 can facilitate performing boot procedures at the memory devices 216. For example, the CPU 310 can facilitate performing boot procedures at the memory devices 316.

While performing the boot procedures at the first memory device and the second memory devices, a memory failure of the first memory device is detected (506). For example, the CPU 210 can detect a memory failure at the first memory device 216a. For example, the CPU 310 can detect a memory failure at the first memory device 316a.

In response to detecting the memory failure of the first memory device, a signal is provided to a power management integrate circuit (PMIC) of the first memory device to disable power at the first memory device (508). For example, the service controller 212, the CPU 210, and/or the override management module 214 can provide a signal to the PMIC 220a of the first memory device 216a to disable power at the first memory device 216a. For example, the service controller 312, the CPU 310, and/or the override management module 314 can provide a signal to the PMIC 320a of the first memory device 316a to disable power at the first memory device 316a.

The boot procedures can continue at the second memory device (510). For example, the CPU 210 can facilitate performing boot procedures at the second memory device 216b. For example, the CPU 310 can facilitate performing boot procedures at the second memory device 316b.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of selectively disabling power delivery to a group of memory devices of an information handling system, the method comprising:

performing an initialization of a first memory device and a second memory device of the memory devices;

after performing the initialization of the memory devices, performing boot procedures at the first memory device and the second memory device;

while performing the boot procedures at the first memory device and the second memory device, detecting, by a processor of the information handling system, a memory failure of the first memory device;

in response to detecting the memory failure of the first memory device, providing, by a transistor switch circuitry that is external to the processor, a signal to a power management integrate circuit (PMIC) of the first memory device to override a power enable signal at the first memory device and disable power at the first memory device; and continuing the boot procedures at the second memory device.

2. The method of claim 1, wherein providing the signal to the PMIC of the first memory device further comprises providing the signal to the PMIC of the first memory device to place the first memory device in a low power mode.

3. The method of claim 2, wherein providing the signal to the PMIC of the first memory device to place the first memory device in the low power mode further includes maintaining power at the PMIC.

4. The method of claim 1, wherein the performing the boot procedures further comprises performing memory training at the first and the second memory devices.

5. The method of claim 1, wherein the performing the boot procedures further comprises performing memory testing at the first and the second memory devices.

6. The method of claim 1, wherein the performing the boot procedures further comprises performing a population rule check at the first and the second memory devices.

7. An information handling system comprising a processor having access to memory media storing instructions executable by the processor to perform operations, comprising:

performing an initialization of a first memory device and a second memory device of memory devices;

after performing the initialization of the memory devices, performing boot procedures at the first memory device and the second memory device;

while performing the boot procedures at the first memory device and the second memory device, detecting, by a processor of the information handling system, a memory failure of the first memory device;

in response to detecting the memory failure of the first memory device, providing, by a transistor switch circuitry that is external to the processor, a signal to a power management integrate circuit (PMIC) of the first memory device to override a power enable signal at the first memory device and disable power at the first memory device; and continuing the boot procedures at the second memory device.

8. The information handling system of claim 7, wherein providing the signal to the PMIC of the first memory device further comprises providing the signal to the PMIC of the first memory device to place the first memory device in a low power mode.

9. The information handling system of claim 8, wherein providing the signal to the PMIC of the first memory device to place the first memory device in the low power mode further includes maintaining power at the PMIC.

10. The information handling system of claim 7, wherein the performing the boot procedures further comprises performing memory training at the first and the second memory devices.

11. The information handling system of claim 7, wherein the performing the boot procedures further comprises performing memory testing at the first and the second memory devices.

12. A non-transitory computer-readable medium storing software comprising instructions executable by one or more computers which, upon such execution, cause the one or more computers to perform operations comprising:

performing an initialization of a first memory device and a second memory device of memory devices;

after performing the initialization of the memory devices, performing boot procedures at the first memory device and the second memory device;

while performing the boot procedures at the first memory device and the second memory device, detecting, by a processor of the information handling system, a memory failure of the first memory device;

in response to detecting the memory failure of the first memory device, providing, by a transistor switch circuitry that is external to the processor, a signal to a power management integrate circuit (PMIC) of the first memory device to override a power enable signal at the first memory device and disable power at the first memory device; and continuing the boot procedures at the second memory device.

* * * * *